Nov. 26, 1968   B. CARROLL ET AL   3,413,391
METHOD OF DEGASSING IN AN IMPREGNATING PROCESS
Filed April 26, 1966   2 Sheets-Sheet 1

INVENTORS B. CARROLL
J. R. SMITH
BY
Stoddard
ATTORNEY

United States Patent Office 3,413,391
Patented Nov. 26, 1968

3,413,391
METHOD OF DEGASSING IN AN IMPREGNATING PROCESS
Ben Carroll and James R. Smith, Winston-Salem, N.C., assignors to Bell Telephone Laboratories, Incorporated, New York, N.Y., a corporation of New York
Filed Apr. 26, 1966, Ser. No. 545,503
10 Claims. (Cl. 264—102)

This invention relates to vacuum impregnating processes and, more particularly, to an improved method of degassing certain material during the procedure of using it in an impregnating process. More specifically, the invention relates to an improved degassing method for removing entrapped air, gas, or vapor from molten material while it is being employed in a vacuum impregnating process.

Processes for impregnating an object or device with some other material, frequently must comply with a requirement that no air, gas, or vapor should remain entrapped in the finished product. For example, this is a requirement of various processes used for insulating an electric component, such as a transformer, by impregnating it with appropriate insulating material which, in some instances, is a suitable molten resin.

This requirement has been met to some degree by employing the so-called "pour-under-vacuum" process. In accordance with this method, the object that is to be impregnated is mounted in a mold or container and the impregnating material is put in a second container. These two containers are then placed in an evacuation chamber. After the air in the chamber has been evacuated, the impregnating material is poured into the first container.

While this process is adequate for some purposes, it is not fully satisfactory for components having closely packed parts, such as an electric transformer. This is because air, gases, and vapors become fortuitously entrapped, such as between the turns of the wire that is wound around the core of the transformer.

The entrapped gaseous matter is especially objectionable in the case of transformers which are intended to operate at high voltages because this gaseous matter tends to facilitate the creation of harmful corona by lowering its starting voltage. In other words, the gaseous matter reduces the dielectric strength of the impregnating material thereby lowering the point at which the electric field surrounding the high voltage transformer will create the undesired corona. This corona is objectionable because it weakens and, in time, destroys the insulation of the transformer thereby facilitating the creation of so-called "flashover" which, in turn, produces a serious loss of electric power.

Accordingly, it is an object of this invention to provide an improved method of performing a vacuum impregnating process.

Another object of the invention is to provide an improved method of degassing certain material during the procedure of using it in an impregnating process.

A more specific object of the invention is to provide an improved degassing method of removing gaseous matter from molten material while it is being employed in a vacuum impregnating process.

These and other objects of the invention are attained by providing nucleation sites at or below the bottom of a device that is being impregnated with molten material. These nucleation sites function to assist or expedite the formation at these points of bubbles of the gaseous matter that is entrapped within the molten material. More importantly, the substance which constitutes the nucleation sites is so selected as to provide a prolific external source of additional gaseous matter. The resulting formation of bubbles of this additional gaseous matter takes place beneath the bottom of the device so that, when the evacuation process draws them upward, they will sweep through the entire mass of molten material.

In other words, the chief function of the nucleation sites is to introduce, at points on or below the bottom of the device, a substantial amount of extraneous gaseous matter which is released in the form of relatively large bubbles. During the evacuation process, these large bubbles are drawn upward through the molten material and the windings of the transformer. In moving upward, the large bubbles produce a sweeping action which causes them to combine with the smaller bubbles of the fortuitously entrapped gaseous matter. The resulting increased buoyancy of these combined bubbles causes them to rise to the surface of the molten material. At this point, these bubbles expand until they break, and their gaseous contents are then removed by the evacuation procedure.

These and other features of the invention are more fully discussed in connection with the following detailed description of the drawing, in which.

Figure 1:
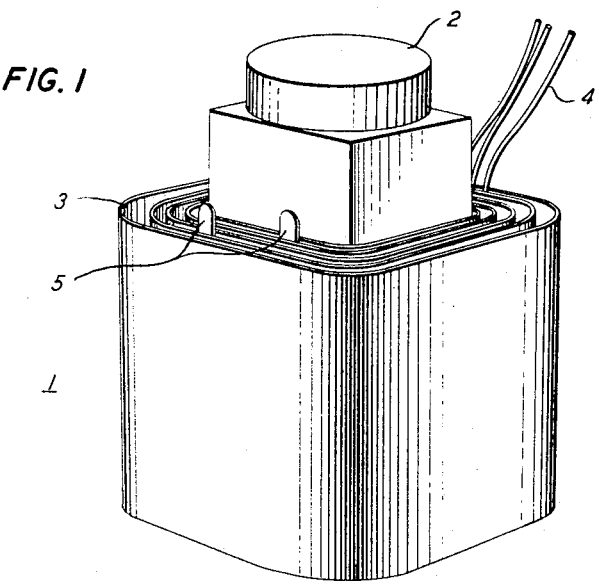
FIG. 1 is a perspective view of one type of object, specifically a transformer, that is to be impregnated.

The invention will now be described with reference to a specific exemplary application thereof, namely, a process for insulating an electric transformer by impregnating it with molten resinous material. Accordingly, the device that is to be impregnated in this illustrative form of the invention is represented in FIG. 1 as being an electric transformer 1 comprising a solid core block 2 having primary and secondary windings thereon. These windings are formed of wire which is wound around the core 2 in different layers each containing many turns of the wire. It is necessary to provide insulation between the core 2 and the windings and also between each winding and between the turns. This insulation may comprise, in part, a sheet 3 of suitable paper wrapped between the layers of wire. The ends of the wire are brought out between the layers of the paper 3 to form thin leads 4 and flat leads 5.

Figure 2:
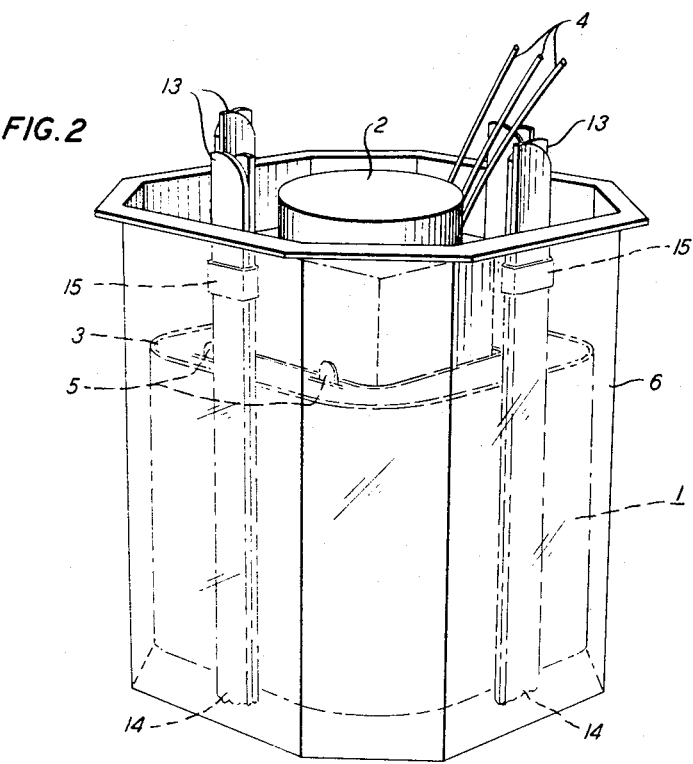
FIG. 2 is a perspective view of the transformer mounted in a conformal mold which also contains several sources of nucleation sites.
Figure 3:
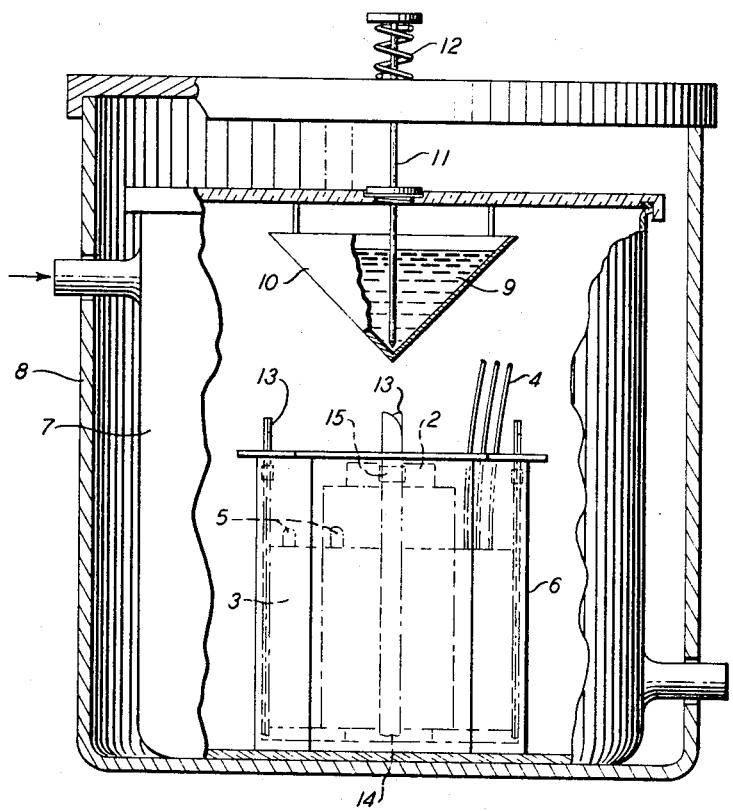
FIG. 3 is a sectional side view of an oven surrounding an evacuation chamber which encloses a container of molten material that is mounted directly above the transformer in the mold.

Since this transformer 1 is designed to operate at high voltages, the above-mentioned insulation is supplemented by impregnating the transformer 1 with a potting compound of suitable material. This is accomplished by employing a method comprising as the first steps the cleaning of the transformer 1 by immersing it in a suitable bath, drying it thoroughly in an appropriate oven, and then placing it in a conformal mold, such as the mold 6 shown in FIG. 2. This mold 6 is made of a suitable material, such as polyethylene, and is designed to fit tightly around the sides of the transformer 1 while being open at the top. The transformer 1 and its mold 6 are placed inside an evacuation chamber 7 which is surrounded by an oven 8, as is shown in FIG. 3, and are vacuum baked for three or more hours at a temperature of 75±5 degrees centigrade and below a maximum pressure of 125 microns of mercury (absolute).

During this time, a suitable potting or impregnating compound is prepared. This may comprise, for example, 100 parts by weight of an appropriate base epoxy resin and 7 parts by weight of a suitable hardener. The resin should be heated in order to reduce its viscosity and then degassed in an evacuation chamber while being constantly agitated mechanically.

After being mixed thoroughly, the compound 9 is allowed to stand for at least twenty minutes. It is then poured into a suitable container 10 which is so formed as to have a V-shaped cross-section. The compound 9 and its container 10 are placed inside the same evacuation chamber that holds the transformer 1 and its mold 6. In performing this step, the container 10 is mounted directly above the transformer 1 as is illustrated in FIG. 3.

The oven heat is maintained at the above-mentioned temperature of 75±5 degrees centigrade but the chamber 7 is now evacuated to an absolute pressure of at least 250 microns of mercury (absolute). The liquid impregnating compound 9 is then released in small increments into the mold 6. This step is accomplished by means of a spring-biased pin or needle 11 which, as is represented in FIG. 3, extends through the tops of the oven 8 and the evacuation chamber 7.

The pin 11 is first pushed down so as to pierce the bottom of the container 10. Its spring 12 then retracts the pin 11 thereby permitting the liquid compound 9 to flow through the hole that was pierced in the container 10. This flow can be terminated by again pushing the pin 11 down so as to block the hole. Thus, the pin 11 functions in the manner of a valve for controlling the flow of the compound 9.

The compound 9 is thus released in small increments until the windings of the wire and the paper insulation 3 have been covered to a height of approximately one-half inch. The evacuation procedure is continued for an additional five to ten minutes and the chamber 7 is then allowed to return to atmospheric pressure.

It should be explained at this point, that, although the upper portion of the core 2 is cylindrical, its main portion has a square cross-section. This main, or lower, portion of the core 2 extends slightly below the bottom ends of the windings of the wire and the paper insulation 3. Thus, when the transformer 1 is initially placed in the mold 6, the lower end of the core 2 will rest on the bottom of the mold 6 and the bottom ends of the windings of the wire and the paper 3 will be positioned above the bottom of the mold 6 by a short distance of about one-eighth to one-quarter of an inch. This spacing is best seen in the cross-sectional view shown in FIG. 3. Accordingly, when the impregnating compound 9 is poured into the mold 6, the compound 9 flows down to the bottom of the mold so as to cover the bottom ends of the windings of the wire and the paper 3.

Although this "pour-under-vacuum" process is adequate for some purposes, it is not fully satisfactory for insulating high voltage transformers. As was mentioned above the reason for this is that air, gases, and vapors become fortuitously entrapped in such locations as between the closely wound turns of the windings of the wire and the paper 3.

Therefore, in accordance with this invention, the impregnating method includes the step of providing nucleation sites at or near the bottom of the transformer 1. Furthermore, the material which constitutes the nucleation sites is so selected as to provide a prolific source of additional gaseous matter. A suitable and inexpensive substance for this purpose is wood in the form of thin slivers. It has been found to be both satisfactory and convenient in this illustrative embodiment of the invention to use ordinary wooden tongue depressors. These can be readily obtained and are very easy to use.

Accordingly, the tongue depressors are formed into slivers 13 by splitting them lengthwise. The length of the slivers 13 should exceed the height of the transformer windings. This requirement is met by breaking off one end of the slivers 13 at an appropriate point. The rough points of the jagged ends 14 of the slivers 13 provide the above-described nucleation sites.

The slivers 13 are inserted into the mold 6 by wedging them between the inner wall of the mold 6 and the outer surface of the paper winding 3. With this particular mold 6 and specific transformer 1, it is convenient to group the slivers 13 in pairs and to bind each pair together with two turns of a suitable tape 15. These pairs of slivers 13 are then inserted at about the mid-point of each of the four sides of the transformer windings and are pushed all the way down to the bottom of the mold 6 so that their ends 14 are at or near the same level as the bottom of the core 2.

Thus, the jagged ends 14 are positioned below the bottoms of the windings of the wire and the paper 3 which, as was explained above, are held at a point about one-eighth to one-quarter of an inch above the bottom of the mold 6 due to the spacing provided by the protruding end of the core 2. This is important because, when nucleation occurs, the resulting bubbles should be formed below the windings so that the bubbles will be forced by the evacuation procedure to sweep up through the windings in order to collect the entrapped gaseous matter as is explained in more detail hereinafter. If the nucleation sites should be above the bottoms of the windings, then the bubbles created during the nucleation process might not be able to collect and remove gaseous matter entrapped in the lower part of the windings and in the molten material at the bottom of the mold 6.

It is also important that the slivers 13 should not be baked or dried because, as was explained above, their chief function is to introduce a substantial amount of gaseous matter. The slivers 13 are satisfactory for this purpose because their cellular structure contains a relatively large quantity of air, gas, or vapor. In this embodiment of the invention, the slivers 13 will furnish a supply of gaseous matter which will last for about one hour before becoming exhausted.

Continuing now with the description of the remaining steps in the method of this invention, the assembly shown in FIG. 3 is again evacuated to the above-mentioned pressure of 250 microns of mercury (absolute) while maintaining the above-mentioned oven temperature of 75±5 degrees centigrade. This produces rapid nucleation of the gaseous matter and results in violent boiling and ebullition of the mixture. The vacuum pressure is then reduced to a maximum of 125 microns of mercury (absolute). From this point, the evacuation process is continued for at least three hours in increments of about twenty minutes. Between each of these increments, the evacuation chamber is returned to atmospheric pressure for a period of one or two minutes.

At the end of this incremental evacuation process, the wooden slivers 13 are pulled out of the potting, or impregnating, compound 9. The impregnated transformer is then exposed to a final evacuation for around six minutes at a maximum pressure of 125 microns of mercury (absolute). At this time, the mold 6 and the transformer are removed from the evacuation chamber 7 and are placed in a suitable curing oven. Here they are heated for at least sixteen hours at 80±5 degrees centigrade and then for at least four hours at 100±2 degrees centigrade. This completes the impregnating process, and the potted transformer is removed from the mold 6.

Potted transformers produced by this method have satisfactorily withstood corona tests of at least 40,000 volts. This success is due to the above-described method of degassing the potting, or impregnating, compound 9. The particularly novel features of this method reside chiefly in the use of the wooden slivers 13 which, as was stated above, perform two important steps in this method. These steps will now be explained in detail.

Firstly, the jagged ends 14 of the slivers 13 provide multiple nucleation sites at points beneath the bottoms of the windings thereby facilitating the release of gaseous matter that was fortuitously entrapped or mixed in this relatively inaccessible portion of the potting compound 9. Furthermore, when nucleation occurs at these sites, the resulting bubbles will be drawn upward between the layers of the turns of the windings by the evacuation procedure. This upward movement of the bubbles produces a sweeping action in that the bubbles combine with gaseous matter entrapped between the turns of the windings of the wire and the paper 3 and carry it up to the surface of the potting compound 9.

Secondly, the wooden slivers 13, in addition to providing nucleation sites, also constitute a prolific external source of additional gaseous matter which is normally contained within their cellular structure. This gaseous matter, which is initially extraneous to the potting compound 6, is released, or drawn out, at the nucleation sites 14 in relatively large quantities of bubbles. Some of these bubbles escape by traveling upward along the edges of the silvers 13. However, due to the mold 6 having been fitted tightly against the outer winding of the paper 3, a significant amount of these bubbles are forced to travel upward through the turns of the windings of the transformer.

Actually, due to the effects of the heat and the vacuum, a veritable flood of bubbles issues from the slivers 13 with considerable violet frothing and agitation. Such a quantity of them is drawn up between the layers of the turns of the windings as to produce implosion therein. This agitates the windings to such an extent as to flex the turns of the paper 3. The result of this agitation and flexing is to stir any entrapped gaseous material so that it will have access to the bubbles of the extraneous gaseous matter and can consequently combine with them due to the effects of gaseous friction. The increased buoyancy of these combined bubbles enables them to rise rapidly to the surface of the impregnating compound 9 where they expand and break, and their gaseous contents are then removed by the evacuation procedure.

What is claimed is:

1. In a process for impregnating a device with molten material wherein the impregnation is performed by steps including the mounting of the device in a mold and covering it with said molten materal while being situated within a heated evacuated chamber,
   the improvement which comprises removing gaseous matter that is fortuitously entrapped in said device and in said molten material,
   said removal being accomplished by the steps of employing a mold which fits tightly around the sides of said device,
   inserting a number of nucleation sites into that portion of said molten material which is at the bottom of said mold thereby creating the formation of bubbles of said gaseous matter in this area of said mold,
   and drawing said bubbles upward by the evacuation procedure whereby said bubbles combine with said entrapped gaseous matter at higher locations within said mold and sweep upward to the surface of said molten material where they break and their gaseous contents are removed by the evacuation procedure.

2. A process in accordance with claim 1 wherein said nucleation sites are constituted by the rough points of a jagged end of a wooden sliver.

3. A process in accordance with claim 1 wherein said nucleation sites are constituted by a substance providing a source of additonal gaseous matter.

4. A process in accordance with claim 3 wherein the step of creating bubble formations includes the formation of bubbles of said additional gaseous material.

5. In a process for impregnating a device with molten material wherein the impregnation is performed by steps including the mounting of the device in a mold and covering it with said molten material while being situated within a heated evacuated chamber,
   the improvement which comprises removing gaseous matter that is fortuitously entrapped in said device and in said molten material,
   said removal being accomplished by the steps of employing a mold which fits tightly around the sides of said device,
   providing an external source of extraneous gaseous matter,
   inserting said external source into said mold at a point between the inner surface of said mold and the outer surface of said device,
   introducing said extraneous gaseous matter into that portion of said molten material which is at the bottom of said mold,
   employing the effects of said heated evacuation for drawing said extraneous gaseous matter upward through said device and said molten material to the surface of said molten material,
   and utilizing the upward movement of said extraneous gaseous matter as a sweeping action for collecting and combining with said entrapped gaseous matter whereby said entrapped gaseous matter is removed and is brought to the surface of said molten material where it is extracted by the evacuation procedure.

6. A process in accordance with claim 5 and further comprising the steps of providing additional external sources of extraneous gaseous matter,
   inserting said additional external sources into said mold at respectively different points between the inner surface of said mold and the outer surface of said device,
   and introducing extraneous gaseous matter from each of said additional sources into that portion of said molten material which is at the bottom of said mold.

7. A process in accordance with claim 5 wherein the step of introducing said gaseous matter into that portion of the molten material which is at the bottom of the mold is performed by providing said external source with a plurality of nucleation sites,
   and inserting said nucleation sites into that portion of said molten material which is at the bottom of said mold.

8. A process in accordance with claim 5 wherein said external source is constituted by a relatively long thin sliver of wood having gaseous matter contained within its cellular structure.

9. A process in accordance with claim 8 wherein the step of introducing said gaseous matter into that portion of the molten material which is at the bottom of the mold is performed by breaking off one end of said wooden sliver and pushing the resulting jagged end thereof all the way down to the bottom of said mold.

10. In a process for impregnating windings wrapped around the core of an electric transformer with molten resinous material wherein the impregnation is performed by steps including the mounting of the transformer in a mold with the bottom of said core protruding beyond the bottom of said windings and covering said windings with said molten resinous material while said mold is situated within a heated evacuation chamber,
    the improvement which comprises removing gaseous matter that is fortuitously entrapped in said windings and in said molten resinous material,
    said removal being accomplished by the steps of employing a mold which fits tightly around the sides of said windings,
    providing nucleation sites by breaking at least one end off each one of a plurality of wooden slivers,
    inserting extraneous gaseous matter into said molten resinous material by wedging each of said wooden slivers into said mold at respectively different points between the inner surface of said mold and the outer surface of said windings,
    said extraneous gaseous matter being contained within the cellular structure of said wooden slivers,
    releasing at least some of said extraneous gaseous matter into that portion of said molten resinous material that lies between the bottom of said windings and the bottom of said protruding core,
    said release being effected by pushing said nucleation sites constituted by said broken ends of said wooden slivers all the way down to the bottom of said mold, employing the effects of said heated evacuation for drawing said extraneous gaseous matter upward through said windings and said molten resinous material to the surface of said molten material, and utilizing the upward movement of said extraneous gaseous matter as a sweeping action for collecting and combining with said entrapped gaseous matter whereby said entrapped gaseous matter is removed and is brought to the upper surface of said molten resinous material where it is extracted by the evacuation procedure.

References Cited

UNITED STATES PATENTS

| | | | |
|---|---|---|---|
| 2,511,436 | 6/1950 | Kauth | 264—102 |
| 3,240,848 | 3/1966 | Burke et al. | 264—102 |

ROBERT F. WHITE, *Primary Examiner.*

J. H. SILBAUGH, *Assistant Examiner.*